US011995109B1

(12) United States Patent
Mirman

(10) Patent No.: US 11,995,109 B1
(45) Date of Patent: May 28, 2024

(54) PERFORMANT PROXIMITY MATCHING BETWEEN SETS OF UNSTRUCTURED RECORDS

(71) Applicant: Extensional, Inc., Brooklyn, NY (US)

(72) Inventor: Matthew Mirman, Brooklyn, NY (US)

(73) Assignee: Extensional, Inc., Brooklyn, NY (US)

( * ) Notice: Subject to any disclaimer, the term of this patent is extended or adjusted under 35 U.S.C. 154(b) by 0 days.

(21) Appl. No.: 18/440,613

(22) Filed: Feb. 13, 2024

(51) Int. Cl.
*G06F 16/30* (2019.01)
*G06F 16/33* (2019.01)
*G06F 16/332* (2019.01)

(52) U.S. Cl.
CPC ...... *G06F 16/3323* (2019.01); *G06F 16/3347* (2019.01)

(58) Field of Classification Search
CPC .......................... G06F 16/3323; G06F 16/3347
See application file for complete search history.

(56) References Cited

U.S. PATENT DOCUMENTS

| 2019/0179858 A1* | 6/2019 | Douze | G06F 16/2365 |
|---|---|---|---|
| 2021/0082180 A1 | 3/2021 | Fedyukov et al. | |
| 2021/0141799 A1 | 5/2021 | Steedman Henderson | |
| 2021/0220991 A1 | 7/2021 | Rajkumar et al. | |
| 2021/0326389 A1 | 10/2021 | Sankar et al. | |
| 2022/0374441 A1* | 11/2022 | Sax | G06F 16/24578 |
| 2022/0374487 A1* | 11/2022 | Banerjee | G06F 16/9537 |
| 2022/0375009 A1* | 11/2022 | Dubois | G06F 16/587 |

FOREIGN PATENT DOCUMENTS

| CN | 110008256 A | * | 7/2019 |
|---|---|---|---|
| CN | 114168766 A | * | 3/2022 |
| CN | 116701469 A | * | 9/2023 |

OTHER PUBLICATIONS

Yu. A. Malkov, Efficient and robust approximate nearest neighbor search using Hierarchical Navigable Small World graphs, Aug. 14, 2018 (v4). https://arxiv.org/abs/1603.09320.
Xiaowei Zhou, Multi-Image Matching via Fast Alternating Minimization, Dec. 2, 2015 (v2). https://arxiv.org/abs/1505.04845.
Wikipedia—The Free Encyclopedia, Nearest neighbor search, last edited on Jan. 22, 2024. https://en.wikipedia.org/wiki/Nearest_neighbor_search.
Wikipedia—The Free Encyclopedia, Word embedding, last edited on Jan. 12, 2024. https://en.wikipedia.org/wiki/Word_embedding.
Matthew Mirman, About Me, downloaded Feb. 13, 2024. https://mirman.com/.

* cited by examiner

*Primary Examiner* — Mahesh H Dwivedi
(74) *Attorney, Agent, or Firm* — Pillsbury Winthrop Shaw Pittman LLP

(57) ABSTRACT

Provided is a process, including obtaining, with a computer system, a first set of vectors in an embedding space and a second set of vectors in the embedding space; determining, with the computer system, which pair of vectors in the first and second sets are closest to one another in the embedding space, the pair having one vector from each set; and storing, with the computer system, in memory, the pair of vectors in the first and second sets that are determined to be closest to one another.

38 Claims, 5 Drawing Sheets

PERFORMANT PROXIMITY MATCHING BETWEEN SETS OF UNSTRUCTURED RECORDS

CROSS-REFERENCE TO RELATED APPLICATIONS

No cross-reference is presented at this time.

BACKGROUND

1. Field

The present disclosure relates generally to machine learning and, more specifically, to performant proximity matching between sets of unstructured records.

2. Description of the Related Art

In a variety of situations, it is useful to find the closest match between two sets of items. This may include determining which item in a first set is closest to any one item in a second set in some space, like an embedding space or geographic space. For example, it may be useful in a situation where one has a collection of sentences uttered by one person and a collection of sentences uttered by another, and they wish to determine which pair of sentences, one uttered by each person, is most semantically similar based on distance in a semantic embedding space. In another example, it may be desirable to determine which frame of video in one movie is most similar to a frame of video in another movie, e.g., based on distance in an image embedding space. Another example, potentially useful to law enforcement, is determining which person observed with a camera at one location over a one-week period is most similar in appearance to a person observed at another location over some other period of time, where similar crimes occurred at both locations with a similar modus operandi. These are just examples of many instances in which this problem occurs.

Generally existing proximity-based searching techniques are not well suited for solving this problem. Nearest-neighbor search algorithms generally search for a member of a single set that is closest to a single target point in that space. These algorithms generally do not compare one set with many points to another set with many points. Rather, they focus on the simpler case, where a single point is being compared to a larger set of points in some space to identify which set member of that set is closest to the target point.

Further, relatively-naive approaches to solving this problem scale poorly in terms of computational complexity. For example, one could write an algorithm that iterated through every point in the first set and for each point compared that point in distance to every point in the second set, keeping track of which pair of points are the closest encountered between the two sets. But this approach encounters substantial computational complexity as the size of the sets increase, scaling in big O notation in time complexity according to the product of n and m, where n is the number of points in the first set and m is the number of points in the second set. Adding just one item to the second set increases the problem size by the number of items in the first, which can be a material challenge for set sizes in the hundreds of millions of items or larger. For problems in which the number of points are in the millions or hundreds of millions, and latency budgets are on the order of hundreds of milliseconds or seconds where compute is limited, such naive approaches are often much too slow on traditional computing architectures. None of which is to suggest that any of these techniques is disclaimed or that any other subject matter described herein is disclaimed.

SUMMARY

The following is a non-exhaustive listing of some aspects of the present techniques. These and other aspects are described in the following disclosure.

Some aspects include a process including: obtaining, with a computer system, a first set of vectors in an embedding space and a second set of vectors in the embedding space; determining, with the computer system, which pair of vectors in the first and second sets are closest to one another in the embedding space, the pair having one vector from each set, by: forming a first hierarchical navigable small world (HNSW) graph with the first set of vectors as nodes and forming a second HNSW graph with the second set of vectors as nodes, each HNSW graph having a plurality of layers in a hierarchy from a bottom layer to a top layer; selecting the top layer of each HNSW graph as a current layer; selecting a pair of starting nodes in the current layer with one node from each HNSW graph as a current pair of nodes; iteratively, until a stopping condition is detected: selecting two subsets of the nodes in the current layer, each member of the two subsets being nodes adjacent one of the current pair of nodes in the current layer or one of the current pair of nodes, each of the two subsets having nodes from a different one of the first and second HNSW graphs; determining a current-closest pair of nodes in the two subsets that are closest to one another in the embedding space, the current-closest pair of nodes having one node from each subset; determining, based on whether a distance in the embedding space between the current-closest pair of nodes is less than a current minimum distance, whether to either: selecting a next lower layer of each HNSW graph as the current layer; or setting the distance in the embedding space between the current-closest pair of nodes as the current minimum distance and set the current-closest pair of nodes as the current pair of nodes; and after detecting the stopping condition, storing, with the computer system, in memory, the pair of vectors in the first and second sets that are determined to be closest to one another.

Some aspects include a tangible, non-transitory, machine-readable medium storing instructions that when executed by a data processing apparatus cause the data processing apparatus to perform operations including the above-mentioned process.

Some aspects include a system, including: one or more processors; and memory storing instructions that when executed by the processors cause the processors to effectuate operations of the above-mentioned process.

BRIEF DESCRIPTION OF THE DRAWINGS

The above-mentioned aspects and other aspects of the present techniques will be better understood when the present application is read in view of the following figures in which like numbers indicate similar or identical elements.

Figure 1:
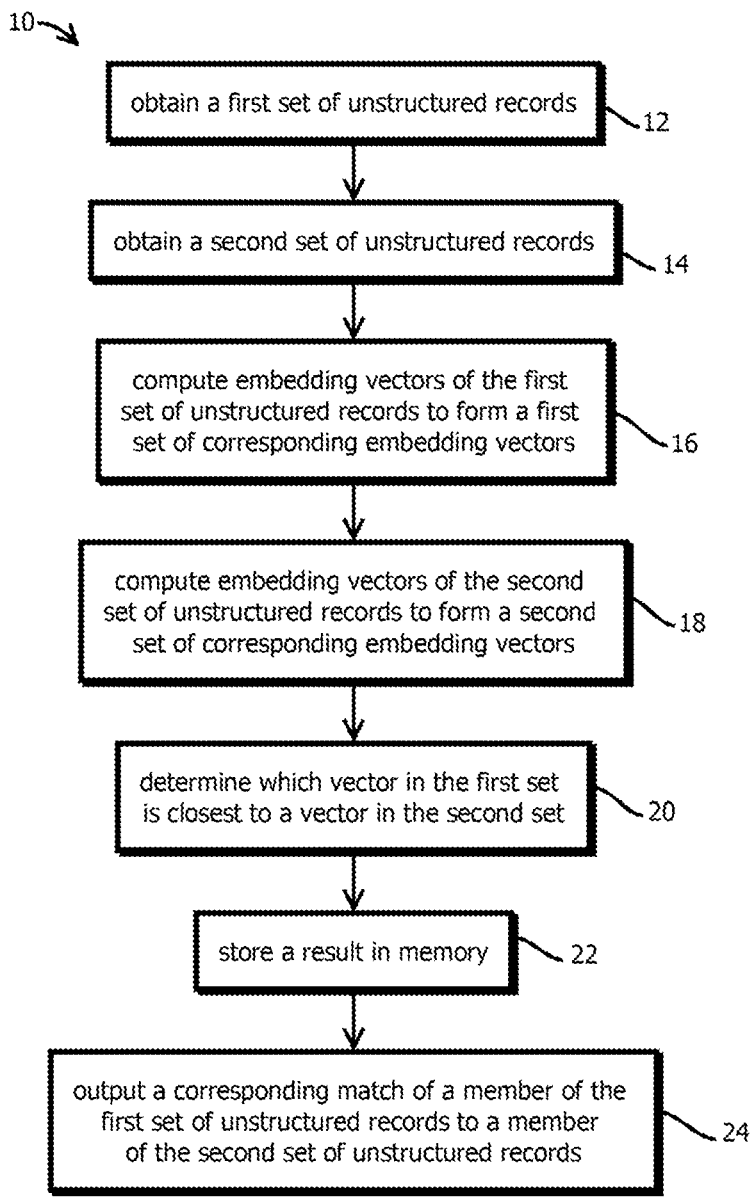
FIG. 1 is a flowchart showing an example of a computer-implemented process to determine which member of a first set is closest to any one member of a second set in accordance with some embodiments of the present techniques.

While the present techniques are susceptible to various modifications and alternative forms, specific embodiments thereof are shown by way of example in the drawings and will herein be described in detail. The drawings may not be to scale. It should be understood, however, that the drawings and detailed description thereto are not intended to limit the present techniques to the particular form disclosed, but to the contrary, the intention is to cover all modifications, equivalents, and alternatives falling within the spirit and scope of the present techniques as defined by the appended claims.

DETAILED DESCRIPTION OF CERTAIN EMBODIMENTS

To mitigate the problems described herein, the inventors had to both invent solutions and, in some cases just as importantly, recognize problems overlooked (or not yet foreseen) by others in the fields of computer science, computational complexity, and database engineering. Indeed, the inventors wish to emphasize the difficulty of recognizing those problems that are nascent and will become much more apparent in the future should trends in industry continue as the inventors expect. Further, because multiple problems are addressed, it should be understood that some embodiments are problem-specific, and not all embodiments address every problem with traditional systems described herein or provide every benefit described herein. That said, improvements that solve various permutations of these problems are described below.

Some embodiments may mitigate the above-described problems or address other issues by creating hierarchical navigable small world graphs, or other hierarchical proximity graphs, for each set being compared and performing layer by layer analyses to find the closest pair of points in each layer before moving to the next layer. In some embodiments, these techniques may be implemented with the processes and data structures and computing environments described below.

FIG. 1 is a flowchart showing an example of a process 10 to determine which member of a first set of unstructured records is closest in some regard to any one member of a second set of unstructured records. The process 10 may be used in a variety of scenarios, such as those described above and below. It should be emphasized that the steps of this process and the other processes described herein may be performed in a different order. Steps may be performed concurrently or serially. Additional steps may be inserted. Some steps may be repeated before moving on to other steps. And some steps may be omitted. None of which is to suggest that any other feature described herein is not also subject to variation. In some cases, the process 10 may be performed in the computing environment described below with reference to FIG. 4, on one or more of the computing devices described below with reference to FIG. 5, as is the case with the other processes and data structures described herein.

Some embodiments may include obtaining a first set of unstructured records, as indicated by block 12, and obtaining a second set of unstructured records, as indicated by block 14. In some cases, these unstructured records may be obtained in a data repository, such as a database, data lake, or file system. The number of records in each set may be more than one million, more than one hundred million, more than one billion, or more than one hundred billion records. Latency budgets may be less than one minute, less than 10 seconds, less than one second, less than 500 milliseconds, or less than 10 milliseconds, e.g., on less than 10 central processing units (CPUs), like on a single thread on a single CPU.

The unstructured records may take a variety of forms, examples including natural language text, images, audio, and multimodal combinations of different channels of signals like images, audio, video or the like. Such records may also include signals from force-feedback sensors, current sensors, temperature sensors, contact sensors, actuator-drive signals, motor current signals, stepper count signals, and the like as may be obtained, for example, from robots, automated vehicles, drones, or industrial processes. The unstructured records in image form may include 2D images, depth images, stereoscopic images, or frames in video. Examples of audio unstructured records may include multi-channel or single channel audio and spatial audio.

The term "unstructured" does not preclude the unstructured records having a format, for example, a digital image in JPEG (Joint Photographic Experts Group) format does not cease to be an "unstructured record" merely because it complies with a JPEG standard, nor does text in Unicode format cease to be an unstructured record merely because it complies with the Unicode standard. Further, unstructured records do not cease to be unstructured records merely because they have associated structured data, like metadata or related records in a relational database. Unstructured records may have relatively high dimensionality, e.g., an image may have a dimensionality above a million or ten million dimensions, or a single page of natural-language text may have even higher dimensionality.

Some embodiments include computing embedding vectors of the first set of unstructured records to form a first set of corresponding embedding vectors, as indicated by block 16, and computing embedding vectors of the second set of unstructured records to form a second set of corresponding embedding vectors, as indicated by block 18. Some embodiments may include obtaining a trained embedding model by which the embedding vectors are computed. In some cases, the embedding model may be a neural network, such as a deep neural network, trained to compute embeddings given a unstructured record as input.

In some embodiments, a trained embedding model may be implemented to transform input data into a vector space where different pieces of data (e.g., unstructured records) are represented as vectors. The embedding model may involve initially training on a large dataset to learn a mapping from the original data representation to a vector space. This mapping may be designed to preserve certain relationships or properties inherent in the data, e.g., to surface latent variables. For example, in the context of natural language processing, words with similar meanings may be mapped to vectors that are close to each other in the vector space, or images depicting similar scenes may be close to each other in another vector space.

One approach to training an embedding model is using neural networks. A neural network-based embedding model may take text as input and pass it through several layers of the network, each of which transforms its input. The final layer may output a vector representation of the input record. This neural network may be trained using a large corpus (e.g., of text, audio, or images), adjusting the network's weights through backpropagation based on the loss between the predicted output and the actual output.

For instance, in the case of a word embedding model like Word2Vec, the training process may involve using either the Continuous Bag of Words (CBOW) or skip-gram approach. In the CBOW approach, the model may predict a target word based on its context, while in the skip-gram approach, the model may use a target word to predict its context words. The training may involve adjusting the weights of the neural network, so that the distance between the vector representation of words and their context words in the resulting embedding space is minimized.

Furthermore, trained embedding models can be fine-tuned for specific tasks or datasets. This fine-tuning process may involve additional training steps where the model's weights are further adjusted using a smaller, task-specific dataset. This process may allow the embedding model to adapt to the nuances and specific features of the new dataset, potentially improving its performance on related tasks.

In addition to text, embedding models can be applied to other types of data, such as images, where convolutional neural networks, or vision transformers, might be used to extract features from the images and map them into an embedding space. Similarly, for sequential data like time series, recurrent neural networks or transformers may be employed to capture temporal dependencies and represent the data in a meaningful vector space.

These embedding models may also include additional features such as normalization layers, dropout layers, or custom activation functions, depending on the specific requirements of the application. The choice of these features can influence the properties of the embedding space, such as its dimensionality, the way it handles outliers, or its ability to capture complex relationships in the data.

For example, a single unstructured record input into the trained embedding model may produce a single corresponding vector in an embedding space. In some cases, a given record is transformed into different vectors in different embedding spaces with different trained embedding models, and some embodiments may respond to instructions that specify which of these vectors to use in the current process.

In some cases, the trained embedding model is a text embedding model, examples including the following: BERT (Bidirectional Encoder Representations from Transformers); GPT (Generative Pre-trained Transformer); ELMo (Embeddings from Language Models); RoBERTa (Robustly Optimized BERT Approach); ALBERT (A Lite BERT); XLNet; T5 (Text-To-Text Transfer Transformer); ERNIE (Enhanced Representation through kNowledge Integration); DistilBERT (Distilled BERT); Word2Vec, and USE (Universal Sentence Encoder).

In some cases the trained embedding model is an image embedding model, examples including those present in the following: VGG (Visual Geometry Group); ResNet (Residual Networks); Inception (Inception Network); AlexNet; DenseNet (Densely Connected Convolutional Networks); MobileNet; EfficientNet; SqueezeNet; GoogLeNet; YOLO (You Only Look Once).

In some cases the trained embedding model is a multimodal embedding model, examples including those present in the following: CLIP (Contrastive Language—Image Pre-training); ViLBERT (Vision-and-Language BERT); LXMERT (Learning Cross-Modality Encoder Representations from Transformers); VL-BERT (Vision-and-Language BERT); UNITER (UNiversal Image-TExt Representation); VLP (Vision-Language Pre-training); ERNIE-ViL (Enhanced Representation through kNowledge Integration for Visual and Language); VisualBERT; OSCAR (Object-Semantics Aligned Pre-training); and MMBT (Multimodal Bitransformers). Some robotics, self-driving, and drone-focused use cases may use embeddings like those created with the following: RoboBERTa (Robotics BERT Approach); R3M (Robotic Representations for Modeling); VLN-BERT (Vision-and-Language Navigation BERT); SORNet (Semantic Object Relationship Network); MTRNet (Multi-Task Robotic Networks); SMPL-E (SMPL for Embodiment); HARMONIC (Hierarchical Affordances for Multimodal Object Representations in Interactive Control); VISOR (Visual Semantic Object Representations for Robotics); PERCH (Probabilistic Embeddings for Robotic Grasping Hands); and Embodied BERT (Embodied Bidirectional Encoder Representations from Transformers).

In some cases, the output of the embedding model may be a vector in an embedding space, such as a latent space. In some cases, the dimensionality of the embedding space may be lower than the dimensionality of the corresponding unstructured record. For example, a megapixel-sized image in digital format may have a dimensionality in the millions or tens of millions of dimensions, while the corresponding embedding vector may be less than 10% of that, such as less than 1% of that number of dimensions. In some cases, the embedding space may be a metric space that satisfies the triangle inequality. The number of dimensions in the embedding space may be, for example, between 2 and 20,000 dimensions such as between 40 and 2000 dimensions.

Distance between vectors in the embedding space may be determined with a variety of similarity measures, examples including Euclidean distance, Manhattan distance, Minkowski distance, Chebyshev distance, and cosine distance between respective pairs of vectors.

Embedding models, where entities are represented as vectors in a high-dimensional space, may be used to measure similarity: the closer two vectors are in this space, the more similar they are. However, there are scenarios where distance in an embedding model might denote something other than similarity. In some models, distance might represent the degree of contrast or opposition between entities. For instance, in sentiment analysis, vectors might be arranged so that positive sentiments are far from negative sentiments. In time series or sequential data, distance in embedding space might reflect the temporal or sequential relationship between events or entities. For example, in a language model, the distance between word embeddings might indicate their relative positions in a sentence or paragraph. In hierarchical data, such as taxonomies, distance in the embedding space could represent hierarchical relationships, where entities that are 'higher' or 'lower' in the hierarchy are positioned further apart. Distance might be used to represent conceptual differences or differences in attributes, rather than direct similarity. For example, in a clothing item embedding, distance might represent differences in style, function, or target demographic, rather than similarity in appearance. In certain optimization problems, the distance in the embedding space might represent an energy or cost function that needs to be minimized or maximized, rather than similarity. In embeddings used for probabilistic models, distance might represent degrees of uncertainty or probability distributions, rather than straightforward similarity.

In some embodiments of the process 10, a computer system may determine which vector in the first set is closest to a vector in the second set, as indicated by block 20, which may indicate which corresponding record in one set is most similar to a record in the other set (or other relationship, depending on the embedding). This step may produce a pair of vectors with one vector taken from the first set and one vector taken from the second set, and that pair of vectors may have a smallest distance there between as compared to every other such pair of vectors between the first set and the second set. Generally, this is distinct from determining a nearest neighbor in a single set, as the output may have one vector from each of a pair of sets against which embodiments are searching. Distance may be determined in the embedding space with a similarity measure. In some embodiments this determination may be performed with the process described below with reference to FIG. 2.

Some embodiments may store a result of the determination in memory, as indicated by block 22. Storing results in memory may include recording a value to a variable in dynamic random access memory, cache memory, or other memory in program space in some cases without persistently storing the value. Or results may be persistently stored.

Some embodiments may output a corresponding match of a member of the first set of unstructured records to a member of the second set of unstructured records, as indicated by block 24. For example, in the pair of vectors determined to be closest in step 20, one vector may correspond to one of the unstructured records in the first set and the other vector may correspond to another one of the unstructured records in a second set, and these unstructured records may be identified in the match that is output. Some embodiments may also output a measure of how closely these two unstructured records match, such as their distance in the embedding space according to the similarity measure. Some embodiments may do a threshold determination and only output a corresponding match if that distance is less than some threshold and output a signal indicating the absence of a match if it is not.

Figure 2:
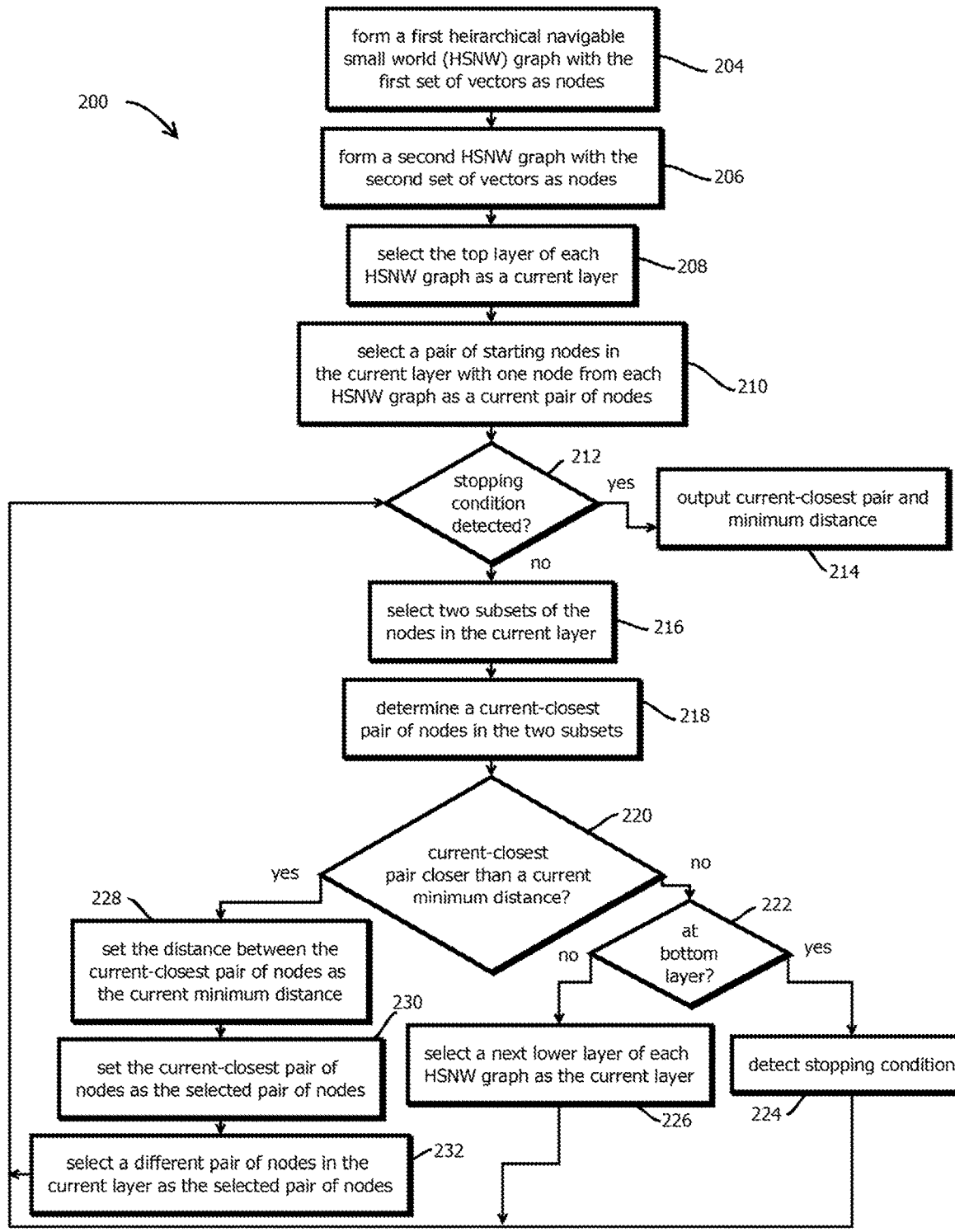
FIG. 2 is a flowchart showing a computer-implemented process to determine which vector in a first set of vectors in an embedding space is closest to any one vector in a second set of vectors in the embedding space in accordance with some embodiments of the present techniques.

FIG. 2 is a flowchart showing an example of a process 200 by which some embodiments may determine which vector in the first set is closest to a vector in the second set, for example, in step 20 of FIG. 1 or other processes. In some embodiments, the process includes forming a first hierarchical-navigable small-world (HNSW) graph with the first set of vectors as nodes as indicated by block 204, and forming a second HNSW graph with the second set of vectors as nodes as indicated by block 206. The term "small" in this name is not a term of degree. It is merely part of the name used in the field. One of ordinary skill in the art would understand that they do not need to measure how large the graph is in order to determine whether it qualifies as an HNSW. Rather, the term "small" is a term of art used in the field to denote a class of data structures, an example of which is shown and discussed below with reference to FIG. 3. In some cases, these graphs may be referred to as hierarchical navigable world graphs or hierarchical proximity graphs. Other types of hierarchical proximity graphs may be used as well, including skip lists, cover trees, balanced distance trees, vantage-point trees, metric trees, Annoy (Approximate Nearest Neighbors Oh Yeah), and the like, by way of example.

In some cases, the graphs may have undirected edges with one of the embedding vectors corresponding to each node. In some embodiments, the graphs may take the form illustrated by the example in FIG. 3, with data structure 300. Some embodiments may include a plurality of hierarchical layers 302, 304, and 306, in respective order of hierarchy, with layer 302 being at a highest layer and 306 being at a lowest. Three layers are shown by way of example, but some embodiments may have only two layers, and some embodiments may have more layers, which is not to suggest that any other feature is not amenable to variation relative to the examples shown in figures. In some embodiments, some nodes of the different graphs may appear on multiple layers, with each node on a given layer appearing on the lower layers, but not necessarily the higher layers.

Two different graphs are illustrated, overlaid on one another, and those two graphs are not connected in this example. The different graphs are denoted by nodes having different shapes, with one graph having nodes denoted by triangles, and the other graph having nodes denoted by circles. As illustrated, the various nodes may be connected to one another by edges. By way of example, one graph with node 308 in layer 302 may have that node 308 replicated in each of the layers 304 and 306 as well. This may be true for each of the nodes in layer 302. In some cases, graph 304 may have all of the nodes of layer 302 and additional nodes, for example nodes 322 and 320, which may be replicated in graph layer 306 as well. Graph layer 306 may have additional nodes that do not appear in the higher layers, like node 324. As shown in layer 302, in one graph node 308 connects to node 310, which connects to node 312, and each of these nodes is replicated in the layers below, along with their connections in this example. Similarly, nodes 314, 316, and 318 are connected as shown, replicated below, and connected in each of the layers 304 and 306 below. As shown in layer 304, this example includes additional nodes 320, 322, and various connections and other unnumbered nodes and their connections, some of which do not appear in the layer above. As shown in layer 306, the bottom layer may further add nodes 324, 326, and various other nodes and their respective connections.

In some embodiments, the process to create a HNSW graph may involve several steps. Initially, the process may begin with the selection of a base layer (e.g., 306) for the graph. This layer may serve as the foundation of the HNSW structure. In the base layer, each node may be connected to its closest neighbors (in the embedding space) based on a distance metric, e.g., those within a threshold distance, or a threshold number of its closest nodes that have, so far, been inserted as nodes are inserted one at a time. Following the establishment of the base layer, additional layers may constructed on top of it in a hierarchical manner Each successive layer may be smaller in the number of nodes than the one below it, containing a subset of the elements from the previous layer. The nodes in these higher layers may be selected based on their centrality or importance in the graph, which can be determined using various selection criteria, including a random selection that is weighted by the number of neighbors of each node in the layer below the one being populated. The connections between nodes in each layer may be established based on the proximity in the layer below. In some embodiments, a greedy algorithm may be employed for this purpose. This algorithm may start with an element in the higher layer and searches for its nearest neighbors in the layer below. The search may be guided by the proximity in the lower layer, with the process iterating until the closest neighbors are identified. In constructing the HNSW graph, a mode may have different neighbors in different layers, denoting the hierarchical structure of the graph. This structure is expected to afford efficient navigation and search within the graph. When searching for the nearest neighbors of a query point, the process typically starts from the topmost layer and progressively moves down the layers. At each layer, the search is confined to the local neighborhood of the closest element found in the previous layer, thereby reducing the search space and improving efficiency. Some embodiments may support both searching matches between sets and searching for a nearest neighbor to a target point in a single set. Some embodiments may include optimization techniques to further enhance the performance of the HNSW graph. These optimizations may involve tuning the parameters of the graph, such as the number of layers, the number of connections per element, or the criteria for selecting elements for higher layers. Furthermore, the process may be adapted to handle dynamic datasets where elements are added or removed over time, necessitating updates to the HNSW structure.

Figure 3:
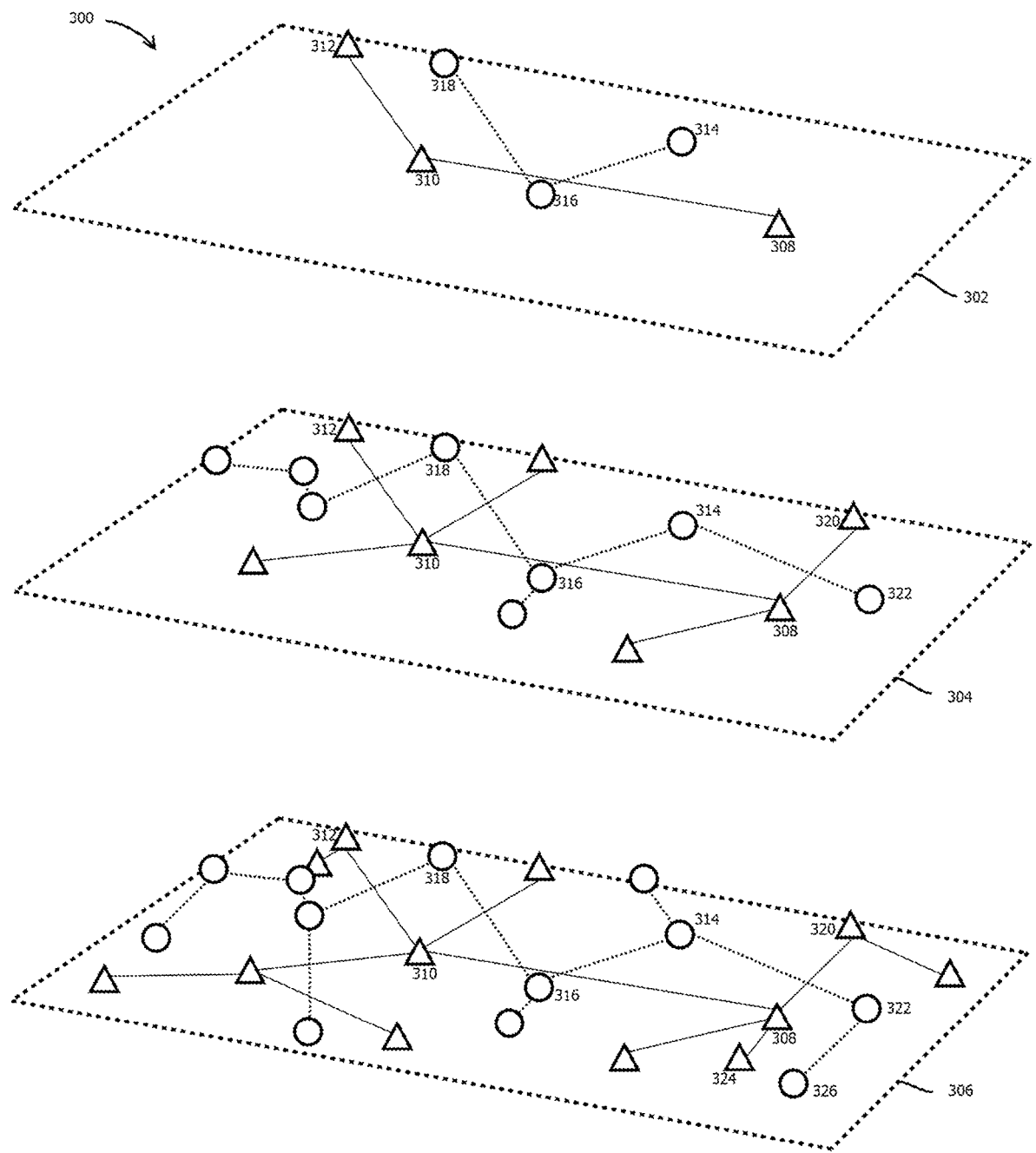
FIG. 3 is a perspective view of an example of two hierarchical navigable small world graphs corresponding to two different sets of vectors in embedding spaces overlaid on one another in accordance with some embodiments of the present techniques.

Some embodiments of the process 200 may include selecting the top layer of each HNSW graph as a current layer, as indicated by block 208. In the example of FIG. 3, this would correspond to selecting layer 302 as the current layer. The role of the current layer may be treated like a variable in the process 200, with different values assigned to it as the process progresses monotonically down the hierarchy, as described below.

Similarly, some embodiments may select a pair of starting nodes in the current layer with one node from each HNSW graph as a current pair of nodes (which also may be referred to as a selected pair of nodes or current selected pair of nodes), as indicated by block 210. Again, these terms current pair of nodes (also referred to as the selected pair of nodes) are treated like variable names, with different nodes in the graphs mapped to them as the process 200 unfolds. To form this pair, one node may be selected, by way of example, from the graph having circles in the example of FIG. 3 as nodes, and one node may be selected from the graph having triangles as nodes in the same example. Generally the pair does not include two nodes from any one graph, but rather draws from both graphs, with one node from each. In some cases, the selection is random, or some embodiments may make a selection based on a number of edges connected to a node, for example, selecting the node with the highest number of edges. Or some embodiments may make a random weighted selection based on a random value and that number of adjacent nodes, e.g., favoring those nodes with more neighbors. Some embodiments may make the selection entirely randomly (e.g., with a pseudorandom function). In some cases, the present process 200 may be repeated multiple times with different randomized initial selections, and results may be compared to select a process run that produces a closest pair of nodes between the two graphs.

Some embodiments may determine whether a stopping condition has been detected, as indicated by block 212. For example, a variable with a Boolean type may be set to false initially and then changed later in the process 200 if a stopping condition has occurred, and block 212 may route program flow based on the state of this variable. In some cases, one aspect of the stopping condition may be that the current layer has iterated down to the bottom layer of the first and second HNSW graphs.

Upon determining that a stopping condition has not been detected, some embodiments may proceed to select two subsets of the nodes in the current layer, as indicated by block 216. (Above, the top layer was designated as the current layer, but the current layer may vary in different iterations of this process as the process 200 iterates downward through the layers of the graph as described below.) In some cases, each of the two subsets are those nodes that are adjacent the current selected pair of nodes from step 210 or those that are otherwise selected when this variable is changed later in this process 200. For example, if node 310 in layer 302 as shown in FIG. 3 is one of the selected current pair and node 316 is the other, then one of the two subsets selected in block 216 may include nodes 312 and 308 in virtue of them being adjacent node 310. And the other of the two subsets may include nodes 318 and 314 in virtue of those nodes being adjacent node 316. In some cases, each subset may only include nodes from one of the two HNSW graphs and each of the subsets may include nodes from a different one of the two HNSW graphs. Some embodiments may select those nodes that are adjacent, adjacent nodes as part of the subset, for example, including nodes within two degrees of separation or more degrees of separation. Some embodiments may select all of those nodes that are only one degree separated from one of the selected current pair of nodes.

Some embodiments may then determine a current closest pair of nodes in the two subsets as indicated by block 218. The distance may be distance in the embedding space of the respective nodes, and distance may be determined with one of the above-described distance measures. The current closest pair may include one node from each of the two subsets and, thus, one node from each of the two HNSW graphs. Some embodiments may only compare distances between nodes of one graph to nodes of another graph.

Some embodiments may compare every such permutation of nodes between the two subsets. For example, in FIG. 3, some embodiments may determine the distances between node 312 and nodes 318, 316, and 314 Similarly, some embodiments may also compute the distances between node 310 and node 318, 316, and 314. In this example, some embodiments may also compute the distances between node 308 and each of nodes 318, 316, and 314. Some embodiments may select the pair of nodes having the smallest distance according to the similarity measure in the embedding space and designate the corresponding pair of nodes, one from each HNSW graph, as the current closest pair of nodes, again treating the pair current closest pair as a variable name to which different pairs of nodes may be mapped as the process of 200 unfolds.

Some embodiments may then determine whether the current closest pair from step 218 is closer than a current minimum distance in block 200. The value of the minimum distance may be initialized earlier in the process 200 to be a relatively high value, such as a maximum value for a type used to characterize the minimum distance, like a maximum integer value or maximum real value supported by a computing system. As explained below, as pairs closer than that value are detected, they may be designated as having the new minimum distance, thus causing the minimum distance to change and monotonically decrease as the process 200 unfolds. Some embodiments may treat a current closest pair that is equal to the minimum distance as being closer and other embodiments may not.

Upon determining that the current closest pair is closer than a current minimum distance, some embodiments may proceed to block 228 and set the distance between the current closest pair of nodes as the current minimum distance. Some embodiments may further set the current closest pair of nodes as the current selected pair of nodes, as indicated by block 230, which is a designation along with a minimum distance that may carry forward into a next iteration of a loop presently being described.

Some embodiments may select a different pair of nodes in the current layer as the selected pair of nodes. In some cases, this pair of nodes is the pair that produced the smallest distance among the permutations in the current subsets, e.g., the node in the first subset that is closest to the node in the second subset. Embodiments may then return to block 212 and determine whether a stopping condition has been detected, returning to block 216 in the event that it has not. In some cases, embodiments may iteratively crawl the current layer of the two HNSW graphs, seeking a closest pair of nodes between the two graphs in the current layer before changing layers.

Changes between layers may occur in the other branch of logic shown by block 220. Upon taking the alternate branch and determining the current-closest pair is not closer than the current minimum distance, some embodiments may then determine in the other branch whether the process 200 is at the bottom layer of the two HNSW graphs as indicated by block 222. Upon determining that the process 200 is not at the bottom layer, some embodiments may select a next lower layer in each of the HNSW graphs as the current layer as indicated by block 226. Program flow may then return to block 212, and those nodes adjacent the current selected pair of nodes in that next lower layer, which may include additional nodes, may be added to the two subsets in block 216. The above-described loop may be repeated in this new lower current layer, crawling that layer for the closest pair of nodes before proceeding to a lower layer.

In block 222, upon determining that the process 200 is at the bottom layer of the two HNSW graphs, some embodiments may then set the stopping condition as being true, as indicated by block 224. Program flow may then return to block 212, which may detect that the stopping condition has occurred and proceed to output the current closest pair and their respective minimum distance as indicated by block 214. This may output a pair of nodes corresponding to a pair of vectors in the embedding space, one from each HNSW graph and one from each of the first and second sets of unstructured records discussed above, along with their distance therebetween, according to the similarity measures described above.

In some embodiments, as noted above, the process 200 may be repeated with different randomized selections of different starting conditions. In some cases, the output current-closest pair and their respective minimum distances from each of the replications may be different in some cases, and some embodiments may select a minimum distance and corresponding current closest pair among those replications to determine a global current closest pair and global minimum distance. The match and closest pair need not be a global minimum to qualify as such. In some cases, these different replications of the process 200 may be executed concurrently, for example on different threads, different processes, different computing devices, or the like. Similarly, in some cases, forming the first and second HNSW graphs may be performed concurrently, for instance on different computing devices. In some cases, the replications may include forming different instances of the HNSW graphs in the different replications as well.

Figure 4:
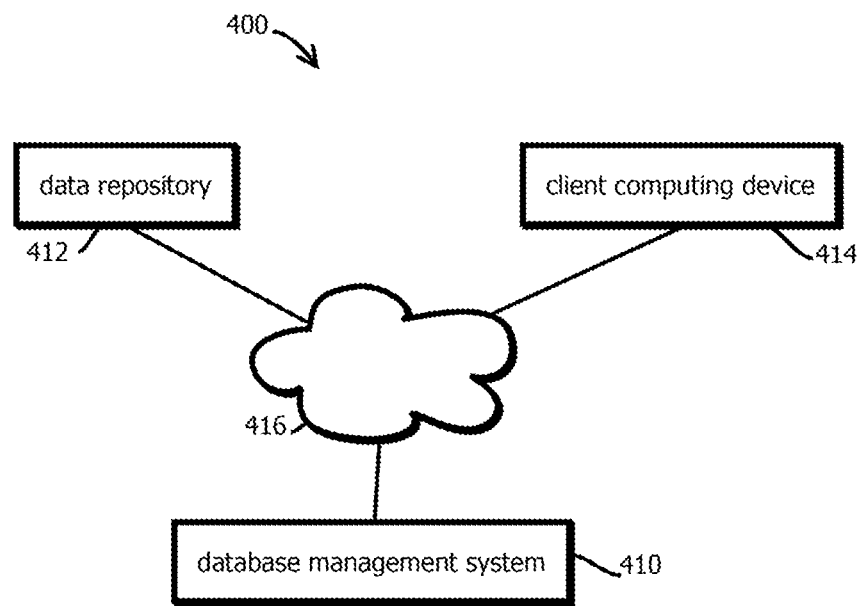
FIG. 4 is a block diagram illustrating an example of a computing environment in which the above-described processes and data structures may be implemented.

FIG. 4 shows an example of a computing environment 400 in block diagram form. The computing environment 400 may include a database management system 410, a data repository 412, a client computing device 414, and a network 416 by which these different systems communicate. In some cases, these different components may be collocated or may be geographically remote from one another. In some cases, some or all of these components 410, 412, and 414, may be replicated with multiple instances having different database management systems or different client computing devices, for example, for different tenant accounts of a software-as-a-service database management system 410. In some cases, the first and second sets of unstructured records discussed above may reside in the data repository 412. In some cases, the client computing device 414 is a user computing device or some other application program interface consumer, like an automated computer process, an artificial-intelligence agent, or the like, that is interrogating data in the data repository 412 via the database management system 410. The database management system 410 may be configured to receive queries from the client computing device 414 and execute them against the data repository 412. In some cases, that data repository 412 may be indexed before receiving a query, for example, by performing processes 10 and 200 described above and storing a result in an index for various types of unstructured records, embedding spaces, and similarity measures that may be referenced in a query.

In some embodiments, the database management system 410 is operative to receive a query in a query language, and that query may include an operator that specifies first and second sets of unstructured records, an embedding space, and a similarity measure or some subset of these arguments. Some embodiments of the database management system 410 may be operative to detect that query operator and retrieve via an indexed result of the above-described processes the requested closest pair of unstructured records in the specified embedding space according to the specified similarity measure. Or in some cases, the embedding space and similarity measure may be unspecified and a default value may be used. In some cases, the database management system 410 is operative to process compound queries with multiple conditions, one of which is proximity in an embedding space between different sets and others which are specified in, for example, a structured query language query describing things like relationships between metadata of the unstructured records or other associated values in a relational database. Some embodiments of the database management system 410 may be operative to process queries that span the divide between relational and non-relational databases, in some cases spanning both structured records and unstructured records that are associated.

Examples of use cases include, for example, detecting which phrase, sentence, or paragraph uttered by one person is most similar to a phrase, sentence, or paragraph uttered by another person in a body of dialogue or set of documents. Another example includes detecting plagiarism by identifying the most similar sentence in a body of natural language text images or audio authored by one person in a corresponding body of work from another. Another example includes detecting a most similar person according to facial recognition, voice, or other attribute sensed at one location or time to the same category of information sensed at another location or time, for example, using security cameras at multiple crime scenes to detect a person who appeared at both crime scenes. Another example includes matching profiles, which may include profiles authored by different people according to which pair of profiles, for example, between a population of men's profiles and a population of women's profiles that are most similar. Another example use case includes capturing streams of information processed by robots in a fleet of robots, drones, or self-driving vehicles, and detecting which scenario encountered by one robot, drone, or vehicle is most similar to a scenario encountered by another robot according to a suite of sensors and control signals, for example, within some time slice.

Figure 5:
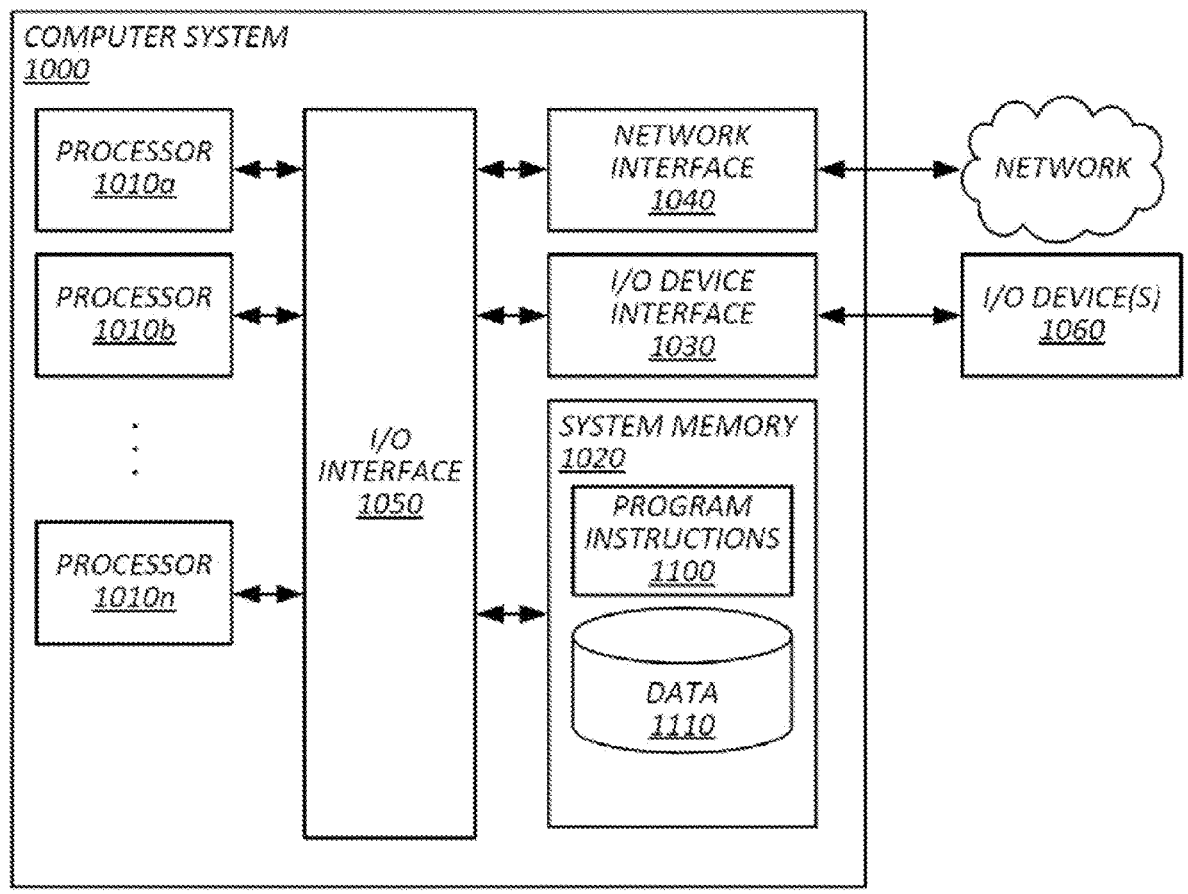
FIG. 5 is a block diagram illustrating an example of a computing device by which the above-described processes and data structures may be implemented in accordance with some embodiments of the present techniques.

FIG. 5 is a diagram that illustrates an exemplary computing system 1000 in accordance with embodiments of the present technique. A single computing device is shown, but some embodiments of a computer system may include multiple computing devices that communicate over a network, for instance in the course of collectively executing various parts of a distributed application. Various portions of systems and methods described herein, may include or be executed on one or more computer systems similar to computing system 1000. Further, processes and modules described herein may be executed by one or more processing systems similar to that of computing system 1000.

Computing system 1000 may include one or more processors (e.g., processors 1010a-1010n) coupled to system memory 1020, an input/output I/O device interface 1030, and a network interface 1040 via an input/output (I/O) interface 1050. A processor may include a single processor or a plurality of processors (e.g., distributed processors). A processor may be any suitable processor capable of executing or otherwise performing instructions. A processor may include a central processing unit (CPU) that carries out program instructions to perform the arithmetical, logical, and input/output operations of computing system 1000. A processor may execute code (e.g., processor firmware, a protocol stack, a database management system, an operating system, or a combination thereof) that creates an execution environment for program instructions. A processor may include a programmable processor. A processor may include general or special purpose microprocessors. A processor may receive instructions and data from a memory (e.g., system memory 1020). Computing system 1000 may be a uni-processor system including one processor (e.g., processor 1010a), or a multi-processor system including any number of suitable processors (e.g., 1010a-1010n). Multiple processors may be employed to provide for parallel or sequential execution of one or more portions of the techniques described herein. Processes, such as logic flows, described herein may be performed by one or more programmable processors executing one or more computer programs to perform functions by operating on input data and generating corresponding output. Processes described herein may be performed by, and apparatus can also be implemented as, special purpose logic circuitry, e.g., an FPGA (field programmable gate array) or an ASIC (application specific integrated circuit). Computing system 1000 may include a plurality of computing devices (e.g., distributed computer systems) to implement various processing functions.

I/O device interface 1030 may provide an interface for connection of one or more I/O devices 1060 to computer system 1000. I/O devices may include devices that receive input (e.g., from a user) or output information (e.g., to a user). I/O devices 1060 may include, for example, graphical user interface presented on displays (e.g., a cathode ray tube (CRT) or liquid crystal display (LCD) monitor), pointing devices (e.g., a computer mouse or trackball), keyboards, keypads, touchpads, scanning devices, voice recognition devices, gesture recognition devices, printers, audio speakers, microphones, cameras, or the like. I/O devices 1060 may be connected to computer system 1000 through a wired or wireless connection. I/O devices 1060 may be connected to computer system 1000 from a remote location. I/O devices 1060 located on remote computer system, for example, may be connected to computer system 1000 via a network and network interface 1040.

Network interface 1040 may include a network adapter that provides for connection of computer system 1000 to a network. Network interface may 1040 may facilitate data exchange between computer system 1000 and other devices connected to the network. Network interface 1040 may support wired or wireless communication. The network may include an electronic communication network, such as the Internet, a local area network (LAN), a wide area network (WAN), a cellular communications network, or the like.

System memory 1020 may be configured to store program instructions 1100 or data 1110. Program instructions 1100 may be executable by a processor (e.g., one or more of processors 1010a-1010n) to implement one or more embodiments of the present techniques. Instructions 1100 may include modules of computer program instructions for implementing one or more techniques described herein with regard to various processing modules. Program instructions may include a computer program (which in certain forms is known as a program, software, software application, script, or code). A computer program may be written in a programming language, including compiled or interpreted languages, or declarative or procedural languages. A computer program may include a unit suitable for use in a computing environment, including as a stand-alone program, a module, a component, or a subroutine. A computer program may or may not correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one or more computer processors located locally at one site or distributed across multiple remote sites and interconnected by a communication network.

System memory 1020 may include a tangible program carrier having program instructions stored thereon. A tangible program carrier may include a non-transitory computer readable storage medium. A non-transitory computer readable storage medium may include a machine readable storage device, a machine readable storage substrate, a memory device, or any combination thereof. Non-transitory computer readable storage medium may include non-volatile memory (e.g., flash memory, ROM, PROM, EPROM, EEPROM memory), volatile memory (e.g., random access memory (RAM), static random access memory (SRAM), synchronous dynamic RAM (SDRAM)), bulk storage memory (e.g., CD-ROM and/or DVD-ROM, hard-drives), or the like. System memory 1020 may include a non-transitory computer readable storage medium that may have program instructions stored thereon that are executable by a computer processor (e.g., one or more of processors 1010a-1010n) to cause the subject matter and the functional operations described herein. A memory (e.g., system memory 1020) may include a single memory device and/or a plurality of memory devices (e.g., distributed memory devices). Instructions or other program code to provide the functionality described herein may be stored on a tangible, non-transitory computer readable media. In some cases, the entire set of instructions may be stored concurrently on the media, or in some cases, different parts of the instructions may be stored on the same media at different times.

I/O interface 1050 may be configured to coordinate I/O traffic between processors 1010a-1010n, system memory 1020, network interface 1040, I/O devices 1060, and/or other peripheral devices. I/O interface 1050 may perform protocol, timing, or other data transformations to convert data signals from one component (e.g., system memory 1020) into a format suitable for use by another component (e.g., processors 1010a-1010n). I/O interface 1050 may include support for devices attached through various types of peripheral buses, such as a variant of the Peripheral Component Interconnect (PCI) bus standard or the Universal Serial Bus (USB) standard.

Embodiments of the techniques described herein may be implemented using a single instance of computer system 1000 or multiple computer systems 1000 configured to host different portions or instances of embodiments. Multiple computer systems 1000 may provide for parallel or sequential processing/execution of one or more portions of the techniques described herein.

Those skilled in the art will appreciate that computer system 1000 is merely illustrative and is not intended to limit the scope of the techniques described herein. Computer system 1000 may include any combination of devices or software that may perform or otherwise provide for the performance of the techniques described herein. For example, computer system 1000 may include or be a combination of a cloud-computing system, a data center, a server rack, a server, a virtual server, a desktop computer, a laptop computer, a tablet computer, a server device, a client device, a mobile telephone, a personal digital assistant (PDA), a mobile audio or video player, a game console, a vehicle-mounted computer, or a Global Positioning System (GPS), or the like. Computer system 1000 may also be connected to other devices that are not illustrated, or may operate as a stand-alone system. In addition, the functionality provided by the illustrated components may in some embodiments be combined in fewer components or distributed in additional components. Similarly, in some embodiments, the functionality of some of the illustrated components may not be provided or other additional functionality may be available.

Those skilled in the art will also appreciate that while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 1000 may be transmitted to computer system 1000 via transmission media or signals such as electrical, electromagnetic, or digital signals, conveyed via a communication medium such as a network or a wireless link Various embodiments may further include receiving, sending, or storing instructions or data implemented in accordance with the foregoing description upon a computer-accessible medium. Accordingly, the present techniques may be practiced with other computer system configurations.

In block diagrams, illustrated components are depicted as discrete functional blocks, but embodiments are not limited to systems in which the functionality described herein is organized as illustrated. The functionality provided by each of the components may be provided by software or hardware modules that are differently organized than is presently depicted, for example such software or hardware may be intermingled, conjoined, replicated, broken up, distributed (e.g. within a data center or geographically), or otherwise differently organized. The functionality described herein may be provided by one or more processors of one or more computers executing code stored on a tangible, non-transitory, machine readable medium. In some cases, notwithstanding use of the singular term "medium," the instructions may be distributed on different storage devices associated with different computing devices, for instance, with each computing device having a different subset of the instructions, an implementation consistent with usage of the singular term "medium" herein. In some cases, third party content delivery networks may host some or all of the information conveyed over networks, in which case, to the extent information (e.g., content) is said to be supplied or otherwise provided, the information may provided by sending instructions to retrieve that information from a content delivery network.

The reader should appreciate that the present application describes several independently useful techniques. Rather than separating those techniques into multiple isolated patent applications, applicants have grouped these techniques into a single document because their related subject matter lends itself to economies in the application process. But the distinct advantages and aspects of such techniques should not be conflated. In some cases, embodiments address all of the deficiencies noted herein, but it should be understood that the techniques are independently useful, and some embodiments address only a subset of such problems or offer other, unmentioned benefits that will be apparent to those of skill in the art reviewing the present disclosure. Due to costs constraints, some techniques disclosed herein may not be presently claimed and may be claimed in later filings, such as continuation applications or by amending the present claims. Similarly, due to space constraints, neither the Abstract nor the Summary of the Invention sections of the present document should be taken as containing a comprehensive listing of all such techniques or all aspects of such techniques.

It should be understood that the description and the drawings are not intended to limit the present techniques to the particular form disclosed, but to the contrary, the intention is to cover all modifications, equivalents, and alternatives falling within the spirit and scope of the present techniques as defined by the appended claims. Further modifications and alternative embodiments of various aspects of the techniques will be apparent to those skilled in the art in view of this description. Accordingly, this description and the drawings are to be construed as illustrative only and are for the purpose of teaching those skilled in the art the general manner of carrying out the present techniques. It is to be understood that the forms of the present techniques shown and described herein are to be taken as examples of embodiments. Elements and materials may be substituted for those illustrated and described herein, parts and processes may be reversed or omitted, and certain features of the present techniques may be utilized independently, all as would be apparent to one skilled in the art after having the benefit of this description of the present techniques. Changes may be made in the elements described herein without departing from the spirit and scope of the present techniques as described in the following claims. Headings used herein are for organizational purposes only and are not meant to be used to limit the scope of the description.

As used throughout this application, the word "may" is used in a permissive sense (i.e., meaning having the potential to), rather than the mandatory sense (i.e., meaning must). The words "include", "including", and "includes" and the like mean including, but not limited to. As used throughout this application, the singular forms "a," "an," and "the" include plural referents unless the content explicitly indicates otherwise. Thus, for example, reference to "an element" or "a element" includes a combination of two or more elements, notwithstanding use of other terms and phrases for one or more elements, such as "one or more." The term "or" is, unless indicated otherwise, non-exclusive, i.e., encompassing both "and" and "or." Terms describing conditional relationships, e.g., "in response to X, Y," "upon X, Y,", "if X, Y," "when X, Y," and the like, encompass causal relationships in which the antecedent is a necessary causal condition, the antecedent is a sufficient causal condition, or the antecedent is a contributory causal condition of the consequent, e.g., "state X occurs upon condition Y obtaining" is generic to "X occurs solely upon Y" and "X occurs upon Y and Z." Such conditional relationships are not limited to consequences that instantly follow the antecedent obtaining, as some consequences may be delayed, and in conditional statements, antecedents are connected to their consequents, e.g., the antecedent is relevant to the likelihood of the consequent occurring. Statements in which a plurality of attributes or functions are mapped to a plurality of objects (e.g., one or more processors performing steps A, B, C, and D) encompasses both all such attributes or functions being mapped to all such objects and subsets of the attributes or functions being mapped to subsets of the attributes or functions (e.g., both all processors each performing steps A-D, and a case in which processor 1 performs step A, processor 2 performs step B and part of step C, and processor 3 performs part of step C and step D), unless otherwise indicated. Similarly, reference to "a computer system" performing step A and "the computer system" performing step B can include the same computing device within the computer system performing both steps or different computing devices within the computer system performing steps A and B. Further, unless otherwise indicated, statements that one value or action is "based on" another condition or value encompass both instances in which the condition or value is the sole factor and instances in which the condition or value is one factor among a plurality of factors. Unless otherwise indicated, statements that "each" instance of some collection have some property should not be read to exclude cases where some otherwise identical or similar members of a larger collection do not have the property, i.e., each does not necessarily mean each and every Limitations as to sequence of recited steps should not be read into the claims unless explicitly specified, e.g., with explicit language like "after performing X, performing Y," in contrast to statements that might be improperly argued to imply sequence limitations, like "performing X on items, performing Y on the X'ed items," used for purposes of making claims more readable rather than specifying sequence. Statements referring to "at least Z of A, B, and C," and the like (e.g., "at least Z of A, B, or C"), refer to at least Z of the listed categories (A, B, and C) and do not require at least Z units in each category. Unless specifically stated otherwise, as apparent from the discussion, it is appreciated that throughout this specification discussions utilizing terms such as "processing," "computing," "calculating," "determining" or the like refer to actions or processes of a specific apparatus, such as a special purpose computer or a similar special purpose electronic processing/computing device. Features described with reference to geometric constructs, like "parallel," "perpendicular/orthogonal," "square", "cylindrical," and the like, should be construed as encompassing items that substantially embody the properties of the geometric construct, e.g., reference to "parallel" surfaces encompasses substantially parallel surfaces. The permitted range of deviation from Platonic ideals of these geometric constructs is to be determined with reference to ranges in the specification, and where such ranges are not stated, with reference to industry norms in the field of use, and where such ranges are not defined, with reference to industry norms in the field of manufacturing of the designated feature, and where such ranges are not defined, features substantially embodying a geometric construct should be construed to include those features within 15% of the defining attributes of that geometric construct. The terms "first", "second", "third," "given" and so on, if used in the claims, are used to distinguish or otherwise identify, and not to show a sequential or numerical limitation. As is the case in ordinary usage in the field, data structures and formats described with reference to uses salient to a human need not be presented in a human-intelligible format to constitute the described data structure or format, e.g., text need not be rendered or even encoded in Unicode or ASCII to constitute text; images, maps, and data-visualizations need not be displayed or decoded to constitute images, maps, and data-visualizations, respectively; speech, music, and other audio need not be emitted through a speaker or decoded to constitute speech, music, or other audio, respectively. Computer implemented instructions, commands, and the like are not limited to executable code and can be implemented in the form of data that causes functionality to be invoked, e.g., in the form of arguments of a function or API call. To the extent bespoke noun phrases (and other coined terms) are used in the claims and lack a self-evident construction, the definition of such phrases may be recited in the claim itself, in which case, the use of such bespoke noun phrases should not be taken as invitation to impart additional limitations by looking to the specification or extrinsic evidence.

In this patent, to the extent any U.S. patents, U.S. patent applications, or other materials (e.g., articles) have been incorporated by reference, the text of such materials is only incorporated by reference to the extent that no conflict exists between such material and the statements and drawings set forth herein. In the event of such conflict, the text of the present document governs, and terms in this document should not be given a narrower reading in virtue of the way in which those terms are used in other materials incorporated by reference.

The present techniques will be better understood with reference to the following enumerated embodiments:

1. A computer-implemented method, comprising: obtaining, with a computer system, a first set of vectors in an embedding space and a second set of vectors in the embedding space; determining, with the computer system, which pair of vectors in the first and second sets are closest to one another in the embedding space, the pair having one vector from each set, by: forming a first hierarchical navigable small world (HNSW) graph with the first set of vectors as nodes and forming a second HNSW graph with the second set of vectors as nodes, each HNSW graph having a plurality of layers in a hierarchy from a bottom layer to a top layer; selecting the top layer of each HNSW graph as a current layer; selecting a pair of starting nodes in the current layer with one node from each HNSW graph as a current pair of nodes; iteratively, until a stopping condition is detected: selecting two subsets of the nodes in the current layer, each member of the two subsets being nodes adjacent one of the current pair of nodes in the current layer or one of the current pair of nodes, each of the two subsets having nodes from a different one of the first and second HNSW graphs; determining a current-closest pair of nodes in the two subsets that are closest to one another in the embedding space, the current-closest pair of nodes having one node from each subset; determining, based on whether a distance in the embedding space between the current-closest pair of nodes is less than a current minimum distance, whether to either: selecting a next lower layer of each HNSW graph as the current layer; or setting the distance in the embedding space between the current-closest pair of nodes as the current minimum distance and set the current-closest pair of nodes as the current pair of nodes; and after detecting the stopping condition, storing, with the computer system, in memory, the pair of vectors in the first and second sets that are determined to be closest to one another.
2. The method of embodiment 1, wherein determining which pair of vectors in the first and second sets are closest to one another in the embedding space is performed in response to: receiving a structured query language (SQL) query; and detecting a similarity search operator in the query in association with the first set of vectors and the second set of vectors.
3. The method of any one of embodiments 1-2, wherein determining which pair of vectors in the first and second sets are closest to one another in the embedding space has a computational complexity of less than $O(nm)$, where n is the number of vectors in the first set and m is the number of vectors in the second set.
4. The method of any one of embodiments 1-3, wherein: the first set of vectors each represent respective segments of natural language text in a first set of segments of natural language text; and the second set of vectors each represent respective segments of natural language text in a second set of segments of natural language text.
5. The method of embodiment 4, wherein: location in the embedding space encodes semantic meaning of the respective segments of natural language text; and determining which pair of vectors in the first and second sets are closest to one another in the embedding space comprises determining which segment of natural language text in the first set of segments is most semantically similar to one of the segments of natural language text in the second set of segments of natural language text.
6. The method of embodiment 5, comprising: determining that a first document having the first set of segments of natural language text plagiarizes a second document having the second set of segments of natural language text based on a distance between the pair of vectors in the first and second sets that are determined to be closest to one another being less than a threshold distance in the embedding space.
7. The method of embodiment 5, comprising: matching an author of the first set of segments of natural language text to an author of the second set of segments of natural language text based on a distance between the pair of vectors in the first and second sets that are determined to be closest to one another being less than a threshold distance in the embedding space.
8. The method of any one of embodiments 1-7, wherein: the first set of vectors comprises more than ten million vectors; the second set of vectors comprises more than ten million vectors; the embedding space has more than 450 dimensions; each HNSW graph has three or more layers; and determining which pair of vectors in the first and second sets are closest to one another in the embedding space is performed in less than 2,500 milliseconds on a single central processing unit.
9. The method of any one of embodiments 1-8, comprising: repeatedly determining which pair of vectors in the first and second sets are closest to one another with different pairs of starting nodes in the different repetitions and selecting a closest pair from among the repetitions.
10. The method of embodiment 9, wherein the different repetitions are performed concurrently in different threads or on different computers.
11. The method of embodiment 9, wherein the different pairs of starting nodes are selected randomly.
12. The method of any one of embodiments 1-11, comprising: determining the distance in the embedding space between the current-closest pair of nodes with steps for determining distance in the embedding space.
13. The method of any one of embodiments 1-12, wherein: selecting the next lower layer of each HNSW graph as the current layer is performed in response to the distance in the embedding space between the current-closest pair of nodes not being less than the current minimum distance.
14. The method of any one of embodiments 1-13, wherein: setting the distance in the embedding space between the current-closest pair of nodes as the current minimum distance and set the current-closest pair of nodes as the current pair of nodes is performed in response to the distance in the embedding space between the current-closest pair of nodes being less than the current minimum distance.
15. The method of embodiment 1, wherein: the first set of vectors represent respective images in a first set of images; the second set of vectors represent respective images in a second set of images; and determining which pair of vectors in the first and second sets are closest to one another in the embedding space comprises determining which image in the first set of images is most similar to one image in the second set of images.
16. The method of embodiment 15, comprising: determining that a given person among a population of candidates was in two places based on images of at least part of the person from the two places corresponding to the pair of vectors in the first and second sets are closest to one another in the embedding space.
17. The method of embodiment 15, wherein: the first set of images are video frames; and the second set of images are video frames.
18. The method of any one of embodiments 1-17, comprising: obtaining the first set of vectors and the second set of vectors with steps for embedding.
19. The method of any one of embodiments 1-18, comprising: forming the first and second HNSW graphs with steps for forming HNSW graphs.
20. A tangible, non-transitory, machine-readable medium storing instructions that when executed by a data processing apparatus cause the data processing apparatus to perform operations comprising the operations of any one of embodiments 1-19.
21. A system, comprising: one or more processors; and memory storing instructions that when executed by the processors cause the processors to effectuate the operations of any one of embodiments 1-19.

What is claimed is:

1. A computer-implemented method, comprising:
obtaining, with a computer system, a first set of vectors in an embedding space and a second set of vectors in the embedding space;
determining, with the computer system, which pair of vectors in the first and second sets are closest to one another in the embedding space, the pair having one vector from each set, by:
forming a first hierarchical navigable small world (HNSW) graph with the first set of vectors as nodes and forming a second HNSW graph with the second set of vectors as nodes, each HNSW graph having a plurality of layers in a hierarchy from a bottom layer to a top layer;
selecting the top layer of each HNSW graph as a current layer;
selecting a pair of starting nodes in the current layer with one node from each HNSW graph as a current pair of nodes;
iteratively, until a stopping condition is detected:
selecting two subsets of the nodes in the current layer, each member of the two subsets being nodes adjacent one of the current pair of nodes in the current layer or one of the current pair of nodes, each of the two subsets having nodes from a different one of the first and second HNSW graphs;
determining a current-closest pair of nodes in the two subsets that are closest to one another in the embedding space, the current-closest pair of nodes having one node from each subset;
determining, based on whether a distance in the embedding space between the current-closest pair of nodes is less than a current minimum distance, whether to either:
selecting a next lower layer of each HNSW graph as the current layer; or
setting the distance in the embedding space between the current-closest pair of nodes as the current minimum distance and set the current-closest pair of nodes as the current pair of nodes; and
after detecting the stopping condition, storing, with the computer system, in memory, the pair of vectors in the first and second sets that are determined to be closest to one another.

2. The method of claim 1, wherein determining which pair of vectors in the first and second sets are closest to one another in the embedding space is performed in response to:
receiving a structured query language (SQL) query; and
detecting a similarity search operator in the query in association with the first set of vectors and the second set of vectors.

3. The method of claim 1, wherein determining which pair of vectors in the first and second sets are closest to one another in the embedding space has a computational complexity of less than O(nm), where n is the number of vectors in the first set and m is the number of vectors in the second set.

4. The method of claim 1, wherein:
the first set of vectors each represent respective segments of natural language text in a first set of segments of natural language text; and
the second set of vectors each represent respective segments of natural language text in a second set of segments of natural language text.

5. The method of claim 4, wherein:
location in the embedding space encodes semantic meaning of the respective segments of natural language text; and
determining which pair of vectors in the first and second sets are closest to one another in the embedding space comprises determining which segment of natural language text in the first set of segments is most semantically similar to one of the segments of natural language text in the second set of segments of natural language text.

6. The method of claim 5, comprising:
determining that a first document having the first set of segments of natural language text plagiarizes a second document having the second set of segments of natural language text based on a distance between the pair of vectors in the first and second sets that are determined to be closest to one another being less than a threshold distance in the embedding space.

7. The method of claim 5, comprising:
matching an author of the first set of segments of natural language text to an author of the second set of segments of natural language text based on a distance between the pair of vectors in the first and second sets that are determined to be closest to one another being less than a threshold distance in the embedding space.

8. The method of claim 1, wherein:
the first set of vectors comprises more than ten million vectors;
the second set of vectors comprises more than ten million vectors;
the embedding space has more than 450 dimensions;
each HNSW graph has three or more layers; and
determining which pair of vectors in the first and second sets are closest to one another in the embedding space is performed in less than 2,500 milliseconds on a single central processing unit.

9. The method of claim 1, comprising:
repeatedly determining which pair of vectors in the first and second sets are closest to one another with different pairs of starting nodes in the different repetitions and selecting a closest pair from among the repetitions.

10. The method of claim 9, wherein the different repetitions are performed concurrently in different threads or on different computers.

11. The method of claim 9, wherein the different pairs of starting nodes are selected randomly.

12. The method of claim 1, comprising:
determining the distance in the embedding space between the current-closest pair of nodes with steps for determining distance in the embedding space.

13. The method of claim 1, wherein:
selecting the next lower layer of each HNSW graph as the current layer is performed in response to the distance in the embedding space between the current-closest pair of nodes not being less than the current minimum distance.

14. The method of claim 1, wherein:
setting the distance in the embedding space between the current-closest pair of nodes as the current minimum distance and set the current-closest pair of nodes as the current pair of nodes is performed in response to the distance in the embedding space between the current-closest pair of nodes being less than the current minimum distance.

15. The method of claim 1, wherein:
the first set of vectors represent respective images in a first set of images;
the second set of vectors represent respective images in a second set of images; and
determining which pair of vectors in the first and second sets are closest to one another in the embedding space comprises determining which image in the first set of images is most similar to one image in the second set of images.

16. The method of claim 15, comprising:
determining that a given person among a population of candidates was in two places based on images of at least part of the person from the two places corresponding to the pair of vectors in the first and second sets are closest to one another in the embedding space.

17. The method of claim 15, wherein:
the first set of images are video frames; and
the second set of images are video frames.

18. The method of claim 1, comprising:
obtaining the first set of vectors and the second set of vectors with steps for embedding.

19. The method of claim 1, comprising:
forming the first and second HNSW graphs with steps for forming HNSW graphs.

20. A tangible, non-transitory, machine readable medium storing instructions that, when executed, effectuate operations comprising:
obtaining, with a computer system, a first set of vectors in an embedding space and a second set of vectors in the embedding space;
determining, with the computer system, which pair of vectors in the first and second sets are closest to one another in the embedding space, the pair having one vector from each set, by:
forming a first hierarchical navigable small world (HNSW) graph with the first set of vectors as nodes and forming a second HNSW graph with the second set of vectors as nodes, each HNSW graph having a plurality of layers in a hierarchy from a bottom layer to a top layer;
selecting the top layer of each HNSW graph as a current layer;
selecting a pair of starting nodes in the current layer with one node from each HNSW graph as a current pair of nodes;
iteratively, until a stopping condition is detected:
selecting two subsets of the nodes in the current layer, each member of the two subsets being nodes adjacent one of the current pair of nodes in the current layer or one of the current pair of nodes, each of the two subsets having nodes from a different one of the first and second HNSW graphs;
determining a current-closest pair of nodes in the two subsets that are closest to one another in the embedding space, the current-closest pair of nodes having one node from each subset;
determining, based on whether a distance in the embedding space between the current-closest pair of nodes is less than a current minimum distance, whether to either:
selecting a next lower layer of each HNSW graph as the current layer; or
setting the distance in the embedding space between the current-closest pair of nodes as the current minimum distance and set the current-closest pair of nodes as the current pair of nodes; and
after detecting the stopping condition, storing, with the computer system, in memory, the pair of vectors in the first and second sets that are determined to be closest to one another.

21. The medium of claim 20, wherein determining which pair of vectors in the first and second sets are closest to one another in the embedding space is performed in response to:
receiving a structured query language (SQL) query; and
detecting a similarity search operator in the query in association with the first set of vectors and the second set of vectors.

22. The medium of claim 20, wherein determining which pair of vectors in the first and second sets are closest to one another in the embedding space has a computational complexity of less than O(nm), where n is the number of vectors in the first set and m is the number of vectors in the second set.

23. The medium of claim 20, wherein:
the first set of vectors each represent respective segments of natural language text in a first set of segments of natural language text; and
the second set of vectors each represent respective segments of natural language text in a second set of segments of natural language text.

24. The medium of claim 23, wherein:
location in the embedding space encodes semantic meaning of the respective segments of natural language text; and
determining which pair of vectors in the first and second sets are closest to one another in the embedding space comprises determining which segment of natural language text in the first set of segments is most semantically similar to one of the segments of natural language text in the second set of segments of natural language text.

25. The medium of claim 24, the operations further comprising:
determining that a first document having the first set of segments of natural language text plagiarizes a second document having the second set of segments of natural language text based on a distance between the pair of vectors in the first and second sets that are determined to be closest to one another being less than a threshold distance in the embedding space.

26. The medium of claim 24, the operations further comprising:
matching an author of the first set of segments of natural language text to an author of the second set of segments of natural language text based on a distance between the pair of vectors in the first and second sets that are determined to be closest to one another being less than a threshold distance in the embedding space.

27. The medium of claim 20, wherein:
the first set of vectors comprises more than ten million vectors;
the second set of vectors comprises more than ten million vectors;
the embedding space has more than 450 dimensions;
each HNSW graph has three or more layers; and determining which pair of vectors in the first and second sets are closest to one another in the embedding space is performed in less than 2,500 milliseconds on a single central processing unit.

28. The medium of claim 20, the operations further comprising:
repeatedly determining which pair of vectors in the first and second sets are closest to one another with different pairs of starting nodes in the different repetitions and selecting a closest pair from among the repetitions.

29. The medium of claim 28, wherein the different repetitions are performed concurrently in different threads or on different computers.

30. The medium of claim 28, wherein the different pairs of starting nodes are selected randomly.

31. The medium of claim 20, the operations further comprising:
determining the distance in the embedding space between the current-closest pair of nodes with steps for determining distance in the embedding space.

32. The medium of claim 20, wherein:
selecting the next lower layer of each HNSW graph as the current layer is performed in response to the distance in the embedding space between the current-closest pair of nodes not being less than the current minimum distance.

33. The medium of claim 20, wherein:
setting the distance in the embedding space between the current-closest pair of nodes as the current minimum distance and set the current-closest pair of nodes as the current pair of nodes is performed in response to the distance in the embedding space between the current-closest pair of nodes being less than the current minimum distance.

34. The medium of claim 20, wherein:
the first set of vectors represent respective images in a first set of images;
the second set of vectors represent respective images in a second set of images; and
determining which pair of vectors in the first and second sets are closest to one another in the embedding space comprises determining which image in the first set of images is most similar to one image in the second set of images.

35. The medium of claim 34, the operations further comprising:
determining that a given person among a population of candidates was in two places based on images of at least part of the person from the two places corresponding to the pair of vectors in the first and second sets are closest to one another in the embedding space.

36. The medium of claim 34, wherein:
the first set of images are video frames; and
the second set of images are video frames.

37. The medium of claim 20, the operations further comprising:
obtaining the first set of vectors and the second set of vectors with steps for embedding.

38. The medium of claim 20, the operations further comprising:
forming the first and second HNSW graphs with steps for forming HNSW graphs.

\* \* \* \* \*